United States Patent
Ray

Patent Number: 5,984,273
Date of Patent: Nov. 16, 1999

[54] WIRE PULLER

[76] Inventor: Brian N. Ray, 1749 S. Glenview Dr., Mesa, Ariz. 85204

[21] Appl. No.: 09/079,541

[22] Filed: May 15, 1998

[51] Int. Cl.[6] .................................................. E21C 29/16
[52] U.S. Cl. ...................................................... 254/134.3 R
[58] Field of Search ............................... 242/390.8, 250, 242/916; 173/36, 170; 408/712, 241 R; 254/134.3 FT, 134.3 PA, 134.3 R

[56] References Cited

U.S. PATENT DOCUMENTS

| | | | |
|---|---|---|---|
| 2,489,319 | 11/1949 | Nave et al. | 242/390.8 |
| 3,185,399 | 5/1965 | Pellicciotti . | |
| 3,190,616 | 6/1965 | Oleson . | |
| 3,610,582 | 10/1971 | Passoni . | |
| 3,968,952 | 7/1976 | Newell . | |
| 3,985,188 | 10/1976 | Steele | 173/170 |
| 4,196,864 | 4/1980 | Cole . | |
| 4,270,734 | 6/1981 | Straight . | |
| 4,290,584 | 9/1981 | Eckels et al. | 242/390.8 |
| 4,456,225 | 6/1984 | Lucas . | |
| 4,497,470 | 2/1985 | Carter et al. . | |
| 4,951,890 | 8/1990 | Sossamon . | |
| 4,956,889 | 9/1990 | Kirk . | |
| 5,149,056 | 9/1992 | Jones . | |
| 5,277,350 | 1/1994 | Thornbury, Jr. . | |
| 5,322,397 | 6/1994 | Spear | 408/712 |
| 5,376,035 | 12/1994 | Forrest . | |
| 5,509,489 | 4/1996 | Lower | 173/170 |
| 5,820,317 | 10/1998 | Van Troba | 408/712 |
| 5,863,160 | 1/1999 | Havener | 408/712 |
| 5,885,036 | 3/1999 | Wheeler | 408/712 |

*Primary Examiner*—Robert C. Watson
*Attorney, Agent, or Firm*—Schmeiser, Olsen & Watts

[57] ABSTRACT

The present invention is a wire puller, which pulls line through conduit, by employing the motor force of a standard right-angle power drill, and an operator to keep the line frictionally coupled to a spool on the wire puller. The apparatus consists of a stand and a frame, onto which is mounted a drive shaft, one end of which is sized to receive the jaws of a standard right-angle power drill. A drill restraining mechanism, also mounted onto the frame, allows the power drill to be positioned, such that actuating the drill turns the drive shaft, without requiring the wire puller operator to hold the drill, and without requiring the wire puller operator to continually depress the drill trigger switch.

20 Claims, 3 Drawing Sheets

WIRE PULLER

BACKGROUND OF THE INVENTION

1. Technical Field

This invention relates to the field of an apparatus for applying pulling force. More specifically the invention relates to an apparatus for placement of conductive wire.

2. Background Art

Supplying buildings with electricity and communications involves threading lines, or cable, through conduit. Typically, the path that cable must travel through conduit includes changes in elevation and turns around corners. Generally, the procedure used to run cable involves first threading lightweight flexible lines through the entire length of conduit. Heavier lines are then pulled through, by attaching them to one end of the lighter line and pulling the lighter line through at the other end of the conduit. This procedure may need to be repeated until a line is threaded which can bear the weight of the target cable, when is then attached and pulled through.

To thread heavier lines, lighter lines must be pulled through first. The pulling force required can be significant depending on the weight of the heavier lines and distance traveled. The pulling force can also increase with the bends and turns in the conduit. Thus, there is a need to substitute machine force for human force to reduce the human effort required in this procedure.

Others have substituted machine force for human force in pulling cable through conduit. Oleson, U.S. Pat. No. 3,190,616, discloses a cable threading apparatus. Newell, U.S. Pat. No. 3,968,952, discloses an assembly for pulling a line. Straight, U.S. Pat. No. 4,270,734, discloses a portable wire puller. Lucas, U.S. Pat. No. 4,456,225 discloses a cable pulling apparatus. Carter et al., U.S. Pat. No. 4,497,470, discloses a powered cart mounted cable puller.

Each of the named apparatus includes a dedicated motor; however, dedicating a motor in most cases adds bulk, weight, and cost. Therefore, the need to substitute machine force for human force in pulling wire without significant bulk, weight, and cost is not met by these apparatus.

One solution to the problem of bulk and weight is to adapt existing multiple-use motorized tools to provide the force for pulling wire through conduit. A common multiple-use motorized tool likely to be available to technicians, who run cable, is the hand-held power drill. Others have applied the use of hand-held power drills for winding. Cole, U.S. Pat. No. 4,196,864 discloses a line winding tool set. Sossamon, U.S. Pat. No. 4,951,890 discloses a drill-operated adapter for unwinding fishing lines from reels. Jones, U.S. Pat. No. 5,149,056 discloses a wire puller for electrical conduits.

These apparatus attach to a power drill, utilizing the power of the drill to pull cable and wind it onto various sized and shaped spindles. However, they are often insufficient for use with the various weights and lengths of cable threaded through conduit. Further, these apparatus share a problem, in that an operator must exert differing degrees of stabilizing force to hold the drill during the winding process. In summary, the prior art apparatus have proven to be cumbersome, and to be very limited in the capacity of line that may be wound onto their spindles.

Thus, it can be seen from the above discussion that it would be an improvement in the art to provide a line puller which can be driven by a multiple use motor so that the weight and cost of the apparatus is minimized. Also it would be an improvement if the line puller could be positioned such that the operator does not have to exert a stabilizing force while the wired is pulled, and is not limited in line winding capacity.

DISCLOSURE OF INVENTION

According to the present invention, an apparatus for pulling line through conduit is disclosed, to which a standard right-angle power drill may be attached as the motor force. The apparatus consists of a stand, and a frame, onto which is mounted a drive shaft, one end of which is sized to receive the jaws of a standard right-angle power drill. A drill restraining mechanism, also mounted onto the frame, allows the power drill to be positioned, such that actuating the drill turns the drive shaft, without requiring the wire puller operator to hold the drill, and without requiring the wire puller operator to depress the drill trigger switch. The stand and frame can be broken down to fit into a 12 inch, by 21 inch, by 7 inch hand-held carrying case for easy transport.

The wire pulling apparatus is located near a conduit opening, or junction box, through which the line is to be pulled. The power drill is positioned onto the wire pulling apparatus, such that the jaws of the drill fit around one end of the drive shaft, and such that the drill switch lever can be used to depress the trigger switch on the drill. The chuck of the drill is used to couple the drill jaws to the drive shaft. The drill switch lever is rotated to actuate the drill that turns the drive shaft. The line to be pulled is then wrapped at least once around a spool attached to the drive shaft and maintained taut by the wire puller operator, to allow the turning of the drive shaft to pull the line through the conduit and out of the junction box.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

MODE(S) FOR CARRYING OUT THE INVENTION

Figure 1:
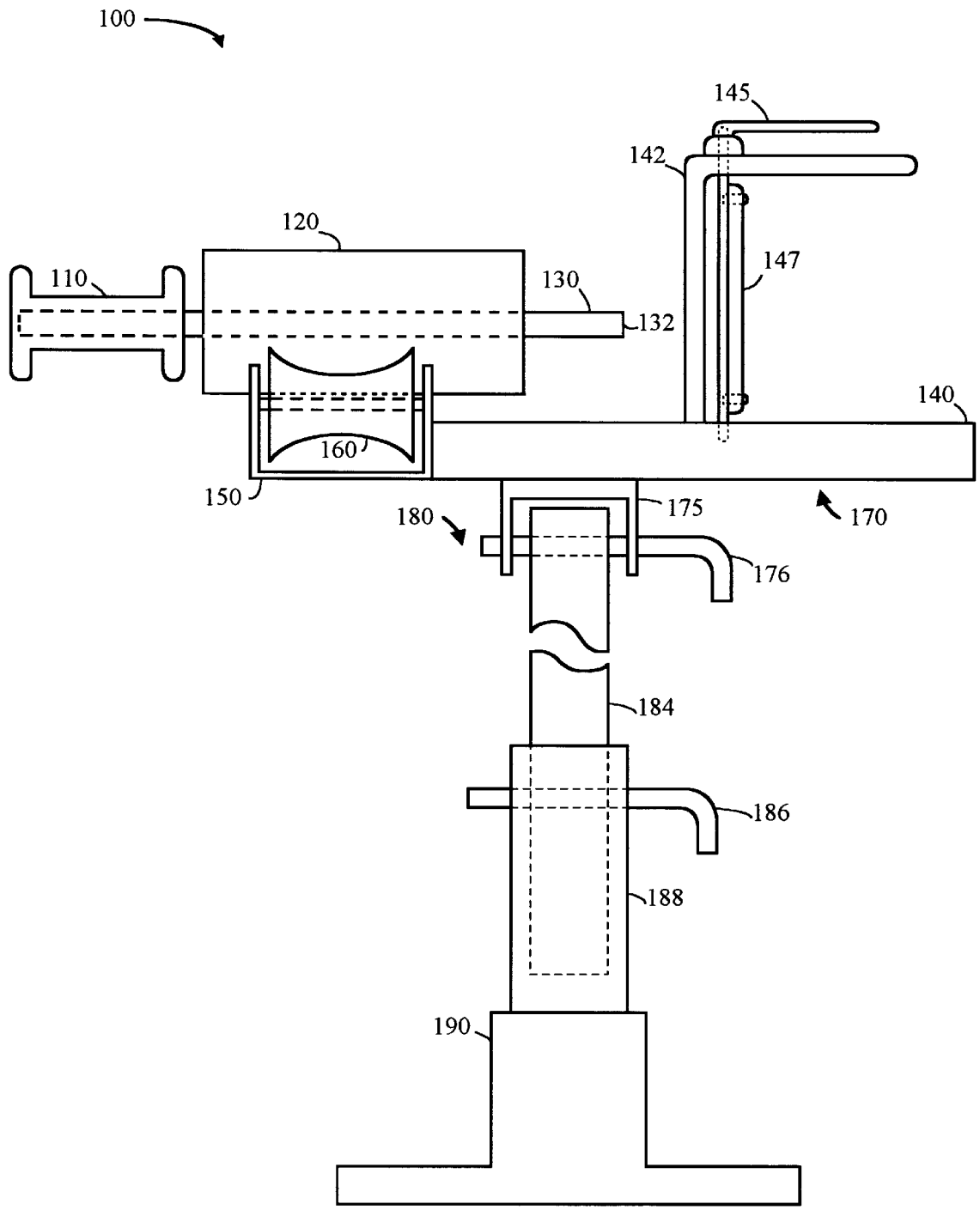
FIG. 1 is a side view of a preferred embodiment of the present invention.

According to a prefeffed embodiment of the present invention, a wire puller that utilizes the motor force of a standard right-angle power drill is disclosed. The wire puller can be operated by a single operator and disassembled to fit into a hand-held case. The hand-held case, measuring approximately 12 inches wide, by 21 inches long, by 7 inches high, facilitates transport of the wire puller to a location where line is to be pulled. A typical location at which line is pulled is a junction box at the end of a length of conduit.

The wire puller is assembled in close proximity to the junction box.

Assembly of the wire puller includes the steps of attaching the wire puller frame to its stand, resting the forearm frame portion of the wire puller on the junction box opening, positioning the power drill such that one end of the wire puller drive shaft fits into the jaws of the drill, and such that the trigger switch of the power drill can be depressed by rotating the wire puller drill switch lever, and tightening the power drill chuck over the drive shaft. Thus, the only attachment of the power drill to the wire puller is the drill jaw to drive shaft coupling. This sole point of attachment allows the power drill to be easily detached from the wire puller, when needed for other drill uses.

Operating the assembled wire puller with attached power drill requires only a single operator. Operation does not require the wire puller operator to hold the power drill, because the attached drill is tightly coupled to the drive shaft and supported by the wire puller frame. Nor does operating the wire puller require the operator to depress the drill trigger switch to start and stop line pulling. Instead, the operator controls the starting and stopping of the line pulling by grasping and releasing a taut hold on the line.

To operate the wire puller, the operator first actuates the power drill, by rotating the drill switch lever on the wire puller. When the drill is actuated, the drive shaft and attached spool rotate. To pull line, the operator wraps the line to be pulled around the rotating spool, for at least one revolution. The wrapping creates a frictional coupling of the spool to the line, which allows the rotating spool to pull the line. As long as the wire puller operator keeps the line taut against the rotating spool, the wire puller pulls line. To stop pulling line, the wire puller operator need only relax the grip on the line, to stop the frictional coupling between the spool and the line. Thus, after initial actuation of the drill, line pulling can be started and stopped without starting and stopping the drill.

Thus, the disclosed wire puller is easy to transport, assemble, and operate. A standard right-angle drill fits easily onto the wire puller to provide the motor force to pull line. Only a single operator is needed to operate the wire puller. The operator need not hold the drill, nor control line pulling from the trigger switch on the drill. Instead, once the drill is actuated, the operator need only keep the line taut on the rotating spool to start line pulling, and relax the line to stop line pulling. And while the wire puller is not operational, the drill can easily be detached from the wire puller to serve other drill uses.

Referring now to FIG. 1, a side view of a preferred embodiment of the present invention is depicted. Wire puller 100 consists of a stand 180 and a frame 170. Stand 180 includes a base 190, a series of hollow square tubes 188 and 184, and a series of pins 176 and 186. Those skilled in the art will recognize that stand 180 can include any number of pieces which together stabilize frame assembly 170.

Base 190 rests on a floor, or surface, of the location where the line is to be pulled. The top of base 190 contains a sleeve, shaped to receive square tube 188. Square tube 188 is hollow to slidably receive square sleeve 184. Square sleeves 188 and 184 have a series of matched sets of holes on opposite sides. The holes are suitably sized and spaced to allow square sleeves 188 and 184 to be fastened together by pin 186 at differing heights. Those skilled in the art will recognize that a number of types of adjustable height mechanisms can be used in place of two hollow square sleeves fastened together with pins.

Square sleeve 184 is attached to frame assembly 170 via pivot bracket 175 and pin 176. Sufficient clearance is necessary between square tube 184 and pivot bracket 175 to allow frame assembly 170 to rotate such that forearm frame portion 150 can tilt downward or upward from the top of square sleeve 184. Thus, attaching the stand to frame assembly 170 prevents movement of the frame assembly in any direction other than that of the pivot. Pin 176 is inserted through one side of pivot bracket 175, through square tube 184, and then through the second side of pivot bracket 175. Forearm frame portion 150 is configured to be able to rest on the edge of a junction box. In this manner, the wire puller stand provides one leg of horizontal support for frame assembly 170, and the junction box (not shown) provides a second leg of horizontal support.

Frame assembly 170 suitably includes a forearm frame portion 150, a drive shaft mounting frame portion 210 (shown in FIG. 2), and a drill restraint frame portion 140. Forearm frame portion 150 includes a narrow arm-like extension of frame assembly 170 and spool 160. The drive shaft mounting frame portion includes a drive shaft 130, a housing 120, and a spool 110. Drill restraint frame portion 140 includes a bracket 142 for holding a standard right-angle drill against frame assembly 170, and drill switch lever 145 having a drill switch actuator 147. Those skilled in the art will recognize that frame assembly 170 can take many shapes to serve the functions of the present invention. Those skilled in the art will also recognize that although drill restraint frame portion 140 has been adapted for a standard right-angle drill, drill restraint frame portion 140 can be adapted for various sizes and shapes of drills.

Spool 160 is mounted on the narrow arm-like extension of frame assembly 170. When positioned a short distance into the junction box, spool 160 facilitates the pulling of the line by guiding the line towards spool 110. For instance, conduit connecting to a junction box typically runs from a direction other than perpendicular to the opening of the junction box. By running the line over spool 160, the line is guided from the direction it travels through the conduit, towards spool 110, which is a direction more or less perpendicular to the opening of the junction box. Thus, spool 160 minimizes any friction created by the pulling of the line out from the junction box.

Drive shaft 130 is the sole attachment for the power drill, and rotates to effect the pulling of line. Drive shaft end 132 is sized to receive the jaws of the power drill. Drive shaft 130 runs through housing 120 which suitably contains bearings to facilitate the rotating of drive shaft 130 around its longitudinal axis. Housing 120 is mounted on frame assembly 170. Spool 110 is mounted on drive shaft 130, on the end opposite of drive shaft end 132, where the power drill attaches. When at least one revolution of line is placed around spool 110, the turning of drive shaft 130 pulls the line through the conduit.

Drill restraint frame portion 140 is designed to allow drill switch lever 145 to actuate the drill, when the drill has been coupled to drive shaft end 132. Bracket 142 is mounted on frame assembly 170. Bracket 142 serves to prevent the power drill from spinning around drive shaft 130 during actuation, when the jaws of the power drill are coupled with drive shaft end 132. Drill switch lever 145 is attached both to bracket 142 and frame assembly 170. Rotating drill switch lever 145 ninety degrees serves to depress the drill trigger and thus actuates the power drill, when the drill is coupled to drive shaft end 132 and held within bracket 142.

Figure 2:
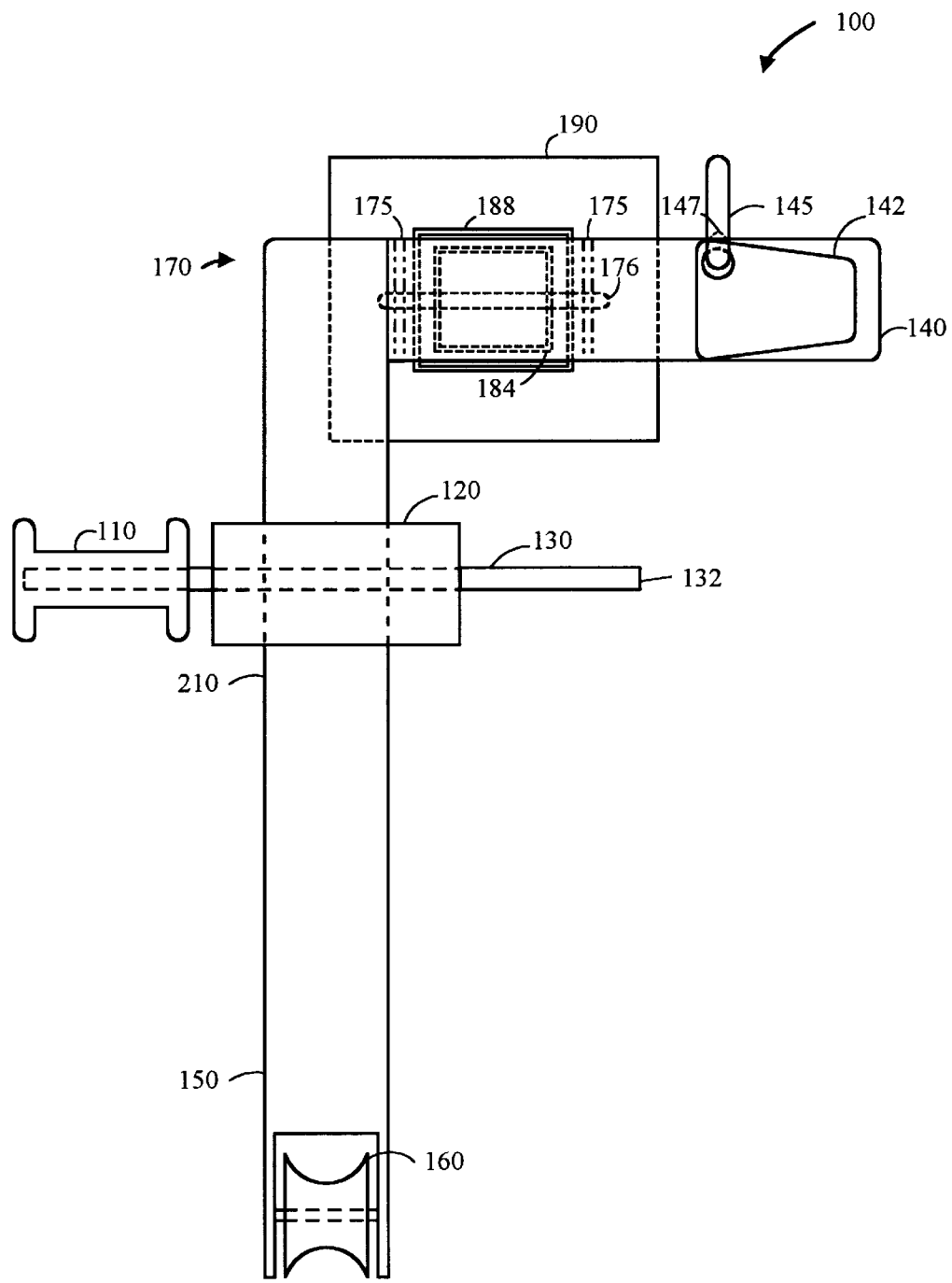
FIG. 2 is a top view of a preferred embodiment of the present invention.

Referring now to FIG. 2, a top view of the assembled wire puller according to the preferred embodiment of the present invention is depicted. The three portions of frame assembly 170 are all clearly visible, namely: forearm frame portion 150, drive shaft mounting frame portion 210, and drill restraint frame portion 140.

FIG. 2 shows how the narrow arm of frame assembly 170 extends outwardly and is suitable to be placed into a junction box. When forearm frame portion 150 is positioned to rest on the edge of a junction box, spool 160 serves to minimize any drag friction created by pulling the line out from the junction box towards spool 110.

FIG. 2 shows drill switch lever 145 in the "off" position, that is, the position in which drill switch actuator 147 will not actuate the power drill. The wire puller operator rotates drill switch lever 145 to rotate drill switch actuator 147 to actuate and to shut off the power drill, once the power drill is coupled to drive shaft end 132 and held between bracket 142 and frame assembly 170.

Figure 3:
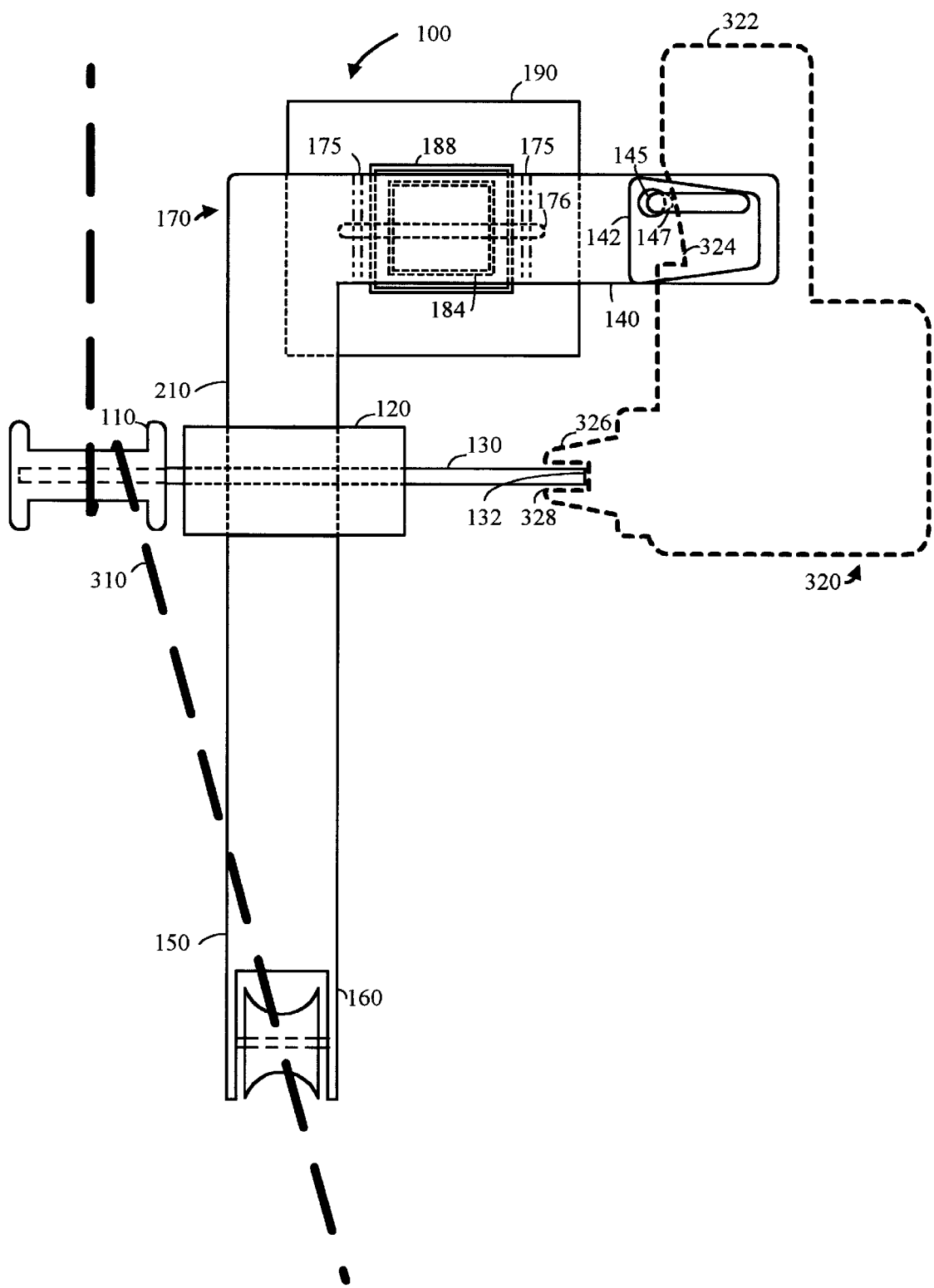
FIG. 3 is a top view depicting the operation of a preferred embodiment of the present invention.

Referring now to FIG. 3, a top view according to the preferred embodiment of the present invention is depicted. Power drill 320 is preferably a standard right-angle drill, and is positioned such that power drill jaws 328 receive drive shaft end 132. Power drill handle 322 fits between bracket 142 and frame assembly 170. Power drill chuck 326 tightens to couple power drill jaws 328 to drive shaft end 132. The drill jaw to drive shaft coupling is the only attachment of power drill 320 to the wire puller.

FIG. 3 shows the wire puller in operation. Drill switch lever 145 and drill switch actuator 147 are "on" position, thus depressing power drill trigger switch 324 and actuating power drill 320. Actuating power drill 320 rotates drive shaft 130 and spool 110. The wire puller operator wraps line 310 around spool 110 for at least one revolution. The wire puller operator then holds line 310 taut to establish frictional coupling between spool 160 and line 310. As the wire puller pulls line 320 out of the junction box, the wire puller operator accepts the feed to maintain the frictional coupling of line 320 and spool 110. The wire puller operates to pull line while the power drill is actuated and the line is frictionally coupled to spool 110. To cease pulling line 310, the operator need only release the grip on line 310 to stop the frictional coupling between spool 110 and line 310. Thus, line pulling can start and stop without the need to rotate drill switch level 145, after initial actuation of power drill 320.

In summary, the wire puller apparatus is easily assembled from pieces which fit into a hand-held case, measuring approximately 12 inches wide, by 21 inches long, by 7 inches high. The wire puller is assembled and optimally positioned in close proximity to a junction box or other location, from which the line is to be pulled. Forearm frame portion 150 suitably rests on the edge of an electrical junction box. Spool 160 in forearm frame portion 150 extends into the junction box and serves to minimize the friction created by pulling the line out of the junction box. Drive shaft end 132 is sized to be received within power drill jaws 328. Power drill 320 is positioned in drill restraint frame portion 140 to receive drive shaft end 132 and to allow drill switch lever 145 and drill switch actuator 147 to actuate power drill 320. Power drill chuck 326 couples power drill 320 to drive shaft end 132.

To operate the wire puller, the operator actuates power drill 320 by rotating drill switch lever 145. When power drill 320 is in operation, it turns drive shaft 130 and spool 110. The operator runs line 310 over spool 160, towards spool 110. The operator then wraps line 310 around spool 110 for at least one revolution, to establish a frictional coupling between spool 160 and line 310. As long as the operator maintains a taut hold of line 310, line 310 will be pulled out of the junction box. To cease pulling line 310 or reduce the speed with which the line is being pulled, the operator need only lessen the grip on line 310 to reduce or disengage the frictional coupling between spool 110 and line 310. Thus, line pulling can start and stop without the need to rotate drill switch lever 145, after initial actuation of power drill 320, and perhaps even more importantly, the tension on the line is infinitely variable and in complete control of the operator.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation. Similarly, unless otherwise specified, any sequence of steps of the method indicated in the drawings or herein are given as an example of a possible sequence and not as a limitation.

What is claimed is:

1. An apparatus comprising:

a frame having a drive shaft mounting portion and a power drill restraint portion, wherein the power drill restraint portion is adapted to register a standard right-angle power drill with the frame and with a switch lever;

a drive shaft mounted with the frame in the drive shaft mounting portion, wherein the drive shaft may be rotated about its longitudinal axis and a first end of the drive shaft is sized to be coupled with the jaws of a power drill; and a switch lever having an "off" position and an "on" position mounted in the power drill restraint portion, the switch lever being continuously retained in the "on" position to depress a trigger switch on a power drill when the switch lever is moved from the "off" position to the "on" position and when such a drill is mounted in the restraint portion and coupled to the drive shaft.

2. The apparatus of claim 1, wherein the drive shaft mounting portion comprises bearings to facilitate the turning of the drive shaft on its longitudinal axis.

3. The apparatus of claim 1, wherein the power drill restraint portion comprises an open bracket.

4. The appratus of claim 1, wherein the sole attachment of a power drill to the frame is made by tightening a chuck on the power drill, such that the jaws of the power drill are coupled with the drive shaft.

5. The apparatus of claim 1, further comprising a first spool mounted on a second end of the drive shaft opposite the first end.

6. The apparatus of claim 1, wherein the operation of the apparatus requires only one operator.

7. The apparatus of claim 1, further comprising a stand, attached to the frame.

8. The apparatus of claim 7, wherein the frame further comprises:

a forearm portion; and a second spool mounted on the forearm portion.

9. The apparatus of claim 8, wherein the stand is attached to the frame, such that the frame can pivot to allow the forearm portion to rest above or below the height of the stand.

10. An apparatus comprising:

a frame having a drive shaft mounting portion, a power drill restraint portion, and a forearm portion, wherein the power drill restraint portion is adapted to register a power drill with the frame and with a switch lever;

a drive shaft mounted with the frame in the drive shaft mounting portion, wherein the drive shaft may be rotated about its longitudinal axis and a first end of the drive shaft is sized to be coupled with the jaws of a power drill;

a switch lever that depresses a trigger switch on a power drill when such a drill is mounted in the restraint portion and coupled to the drive shaft;

a first spool mounted on a second end of the drive shaft opposite the first end;

a second spool mounted on the forearm portion of the frame; and a stand attached to the frame, such that the frame can pivot to allow the forearm portion to rest above or below the height of the stand.

11. The apparatus of claim 10, wherein the drive shaft mounting portion comprises bearings to facilitate the turning of the drive shaft on its longitudinal axis.

12. The apparatus of claim 10, wherein the power drill restraint portion comprises an open bracket.

13. The apparatus of claim 10, wherein the sole attachment of a power drill to the frame is made by tightening a chuck on the power drill, such that the jaws of the power drill are coupled with the drive shaft.

14. An apparatus comprising:

a frame having a drive shaft mounting portion and a power drill restraint portion, wherein the power drill restraint portion is adapted to register a power drill with the frame;

a drive shaft mounted with the frame in the drive shaft mounting portion, wherein the drive shaft may be rotated about its longitudinal axis and a first end of the drive shaft is sized to be coupled with the jaws of a power drill; and a switch lever having an "off" position and an "on" position mounted on the frame, the switch lever being continuously retained in the "on" position to depress a trigger switch on a power drill when the switch lever is moved from the "off" position to the "on" position and when such a drill is mounted in the restraint portion and coupled to the drive shaft.

15. The apparatus of claim 14, wherein the power drill restraint portion comprises an open bracket.

16. The apparatus of claim 14, wherein the sole attachment of a power drill to the frame is made by tightening a chuck on the power drill such that the jaws of the power drill are coupled with the drive shaft.

17. The apparatus of claim 14, further comprising a stand, attached to the frame.

18. The apparatus of claim 17, wherein the frame further comprises:

a forearm portion; and a second spool mounted on the forearm portion.

19. The apparatus of claim 18, wherein the stand is attached to the frame, such that the frame can pivot to allow the forearm portion to rest above or below the height of the stand.

20. The apparatus of claim 14, further comprising a first spool mounted on a second end of the drive shaft opposite the first end.

* * * * *